(12) United States Patent
Fanshawe et al.

(10) Patent No.: US 8,833,263 B2
(45) Date of Patent: Sep. 16, 2014

(54) TRACK SYSTEMS

(71) Applicant: Hepco Slide Systems Limited, Tiverton (GB)

(72) Inventors: Peter James Fanshawe, Taunton (GB); Steven Philip Rendall, Wellington (GB)

(73) Assignee: Hepco Slide Systems Limited (GB)

( * ) Notice: Subject to any disclaimer, the term of this patent is extended or adjusted under 35 U.S.C. 154(b) by 0 days.

(21) Appl. No.: 13/694,916

(22) Filed: Jan. 18, 2013

(65) Prior Publication Data

US 2013/0192487 A1    Aug. 1, 2013

(30) Foreign Application Priority Data

Jan. 26, 2012   (GB) .................................. 1200888.4

(51) Int. Cl.
*B61B 13/04*    (2006.01)
*B61B 13/02*    (2006.01)

(52) U.S. Cl.
CPC ................. *B61B 13/02* (2013.01); *B61B 13/04* (2013.01)
USPC ............................................. 104/118; 384/45

(58) Field of Classification Search
USPC ................ 104/107–111, 118, 119, 120, 121; 385/45
See application file for complete search history.

(56) References Cited

U.S. PATENT DOCUMENTS

| | | | | |
|---|---|---|---|---|
| 4,296,974 A * | 10/1981 | Teramachi | ....................... | 384/45 |
| 5,069,141 A * | 12/1991 | Ohara et al. | ..................... | 105/30 |
| 5,108,197 A * | 4/1992 | Morita | ............................. | 384/45 |
| 5,231,933 A * | 8/1993 | DiRosa | ............................ | 105/73 |
| 5,308,170 A * | 5/1994 | Yamaguchi et al. | ............ | 384/45 |
| 5,411,334 A * | 5/1995 | Takei et al. | ...................... | 384/45 |
| 5,735,214 A * | 4/1998 | Tsuboi | ......................... | 105/29.1 |
| 6,042,269 A * | 3/2000 | Konomoto | ...................... | 384/45 |
| 6,338,573 B1 * | 1/2002 | Michioka et al. | .............. | 384/45 |
| 6,488,411 B2 * | 12/2002 | Michioka et al. | .............. | 384/45 |
| 7,182,024 B2 * | 2/2007 | Pfeiffer | ......................... | 104/119 |
| 2002/0028030 A1 * | 3/2002 | Michioka et al. | .............. | 384/45 |
| 2006/0207470 A1 * | 9/2006 | Pfeiffer | ......................... | 104/118 |
| 2009/0154850 A1 * | 6/2009 | Michioka et al. | .............. | 384/54 |
| 2010/0005998 A1 * | 1/2010 | Kempf | .......................... | 105/150 |
| 2010/0150483 A1 * | 6/2010 | Aida et al. | ....................... | 384/45 |

(Continued)

FOREIGN PATENT DOCUMENTS

| | | |
|---|---|---|
| GB | 2 261 863 A | 6/1993 |
| JP | 307060 A | 3/1991 |
| JP | 5-54601 | 7/1993 |
| NL | 1001452 C2 | 10/1995 |

*Primary Examiner* — Jason C Smith
(74) *Attorney, Agent, or Firm* — Ira S. Dorman

(57) ABSTRACT

A track system includes a track 1 and one or more carriages 10 having bearing wheels engaged with the track such that the carriages can travel along the track. Each carriage has a single bearing 12 engaged with the inner side of the track and a pair of bearing wheels 13, 14 engaged with an opposite side of the track. The width of the track between the two sides varies such as to maintain a tolerance better than 0.05 mm between the bearing wheels and the respective sides of the track. The load capacity of the carriage can be increased and centred by making the single bearing 12 larger than the other two bearing wheels 13 and 14. The track 1 may be machined in one piece, optionally with an integral base plate. In another embodiment the track has spaced inner and outer sections with a rack engaged by a drive pinion mounted on the carriage between the two sections.

11 Claims, 8 Drawing Sheets

(56) References Cited

U.S. PATENT DOCUMENTS

| | | |
|---|---|---|
| 2010/0183252 A1* | 7/2010 | Lin et al. ............ 384/45 |
| 2010/0209027 A1* | 8/2010 | Pfister et al. ......... 384/13 |
| 2010/0209029 A1* | 8/2010 | Pfister et al. ......... 384/45 |
| 2011/0033141 A1* | 2/2011 | Chen et al. ........... 384/45 |
| 2011/0058758 A1* | 3/2011 | Menges et al. ........ 384/45 |
| 2011/0110615 A1* | 5/2011 | Kishi et al. ........... 384/42 |
| 2013/0192487 A1* | 8/2013 | Fanshawe et al. ..... 104/118 |

* cited by examiner

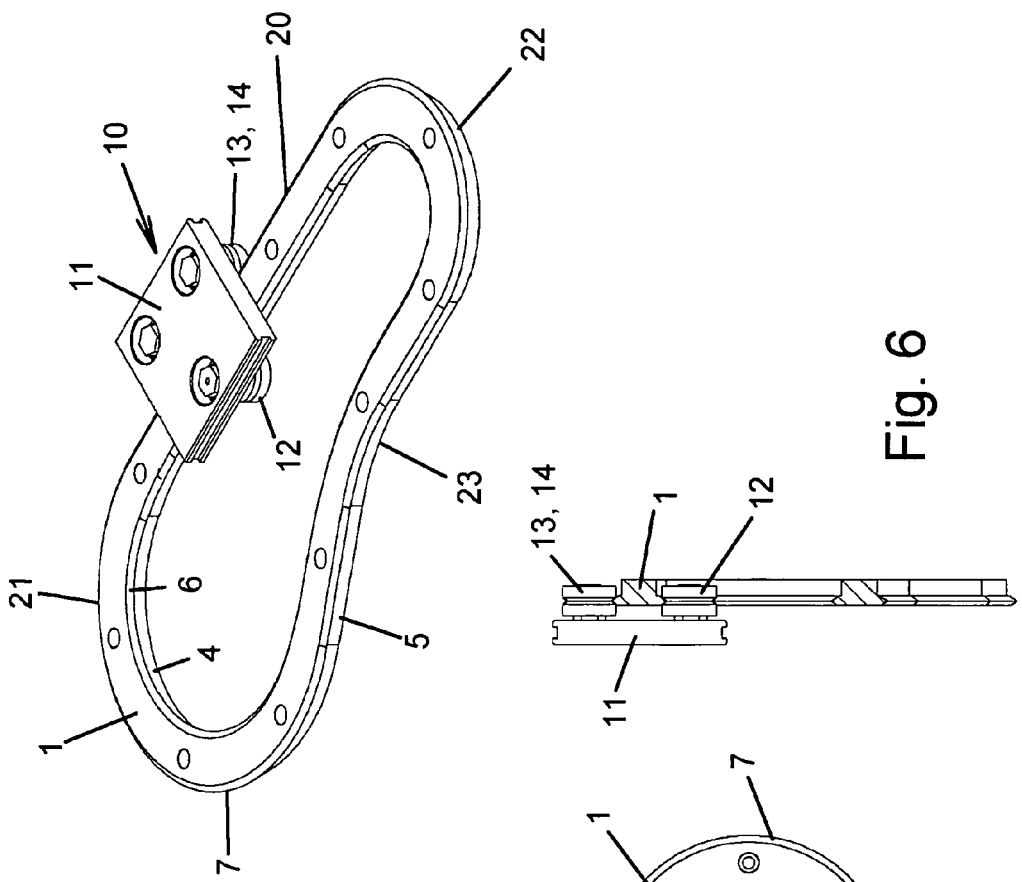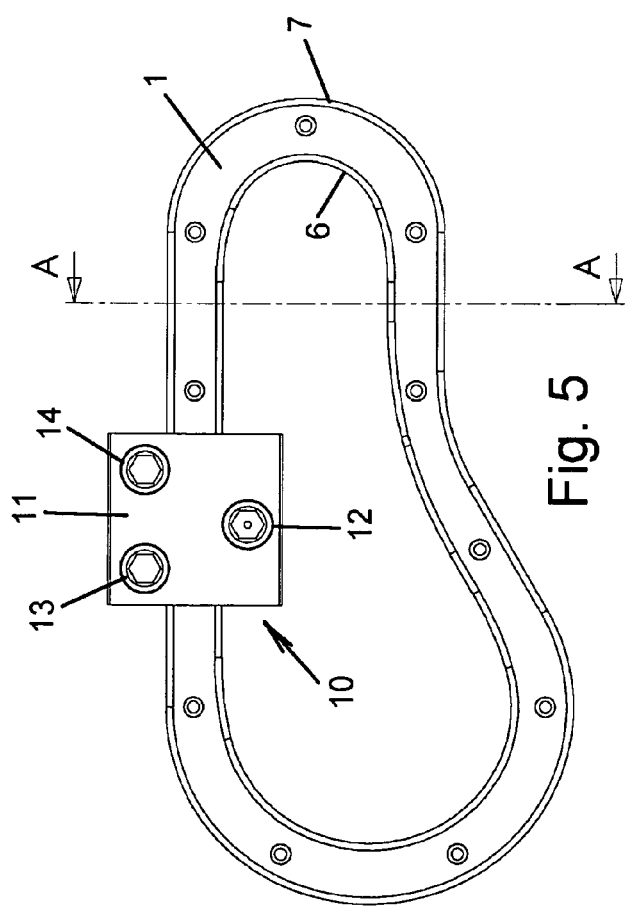

WHEEL CENTRE CALCULATION

Track inner radius = R1
Wheel radius = v
Inner wheel half spacing = q
Wheel perpendicular spacing = z
Wheel maximum lift off = LO Track outer radius = R2
Track width = s
Outer wheel half spacing = p
Inner wheel centre locus radius = r $r = R1 - v$                  $z = s + 2v$ $j^2 = r^2 - q^2$             $j = \sqrt{r^2 - q^2}$ $(j+z)^2 = (r+z)^2 - p^2$     $p = \sqrt{(j+z)^2 - (r+z)^2}$ $LO = \sqrt{(p-q)^2 + z^2} - z$

TRACK SYSTEMS

TECHNICAL FIELD OF THE INVENTION

This invention relates to track systems of the kind which include a track having a combination of straight and curved portions or curved portions with different radii of curvature and one or more carriages having bearing wheels engaged with the track such that the carriages can travel along the track.

BACKGROUND

In existing track systems (see FIGS. 1, 2 and 3), the track is generally made up of straight and curved sections which are connected by joints and are often mounted onto a base plate to provide support. The width of the track is substantially constant throughout the straight and curved sections. The carriage or carriages which run on these tracks usually have four profiled bearing wheels which engage on a profile on the sides of the track. Track systems can form both closed and open paths.

A first type of carriage (FIGS. 1 and 2) has four bearing wheels located with their centres at the corners of a trapezium whose dimensions provide a substantially consistent fit when the carriage is wholly on the straight and the curved portions of the track. This design of carriage runs on tracks which include curved sections of a single radius and direction. As this type of carriage traverses a joint between straight and curve, the fit on the track becomes looser, often resulting in a clearance condition. Such clearances may be undesirable, and become less acceptable the larger they are. The optimum positions for the wheels, and the maximum clearance as the carriage traverses the joint between straight and curve can be determined using the formulae accompanying the diagram shown in FIG. 14. For example, for a typical system in which the centres of the inner wheels are 40 mm apart and track a radius of 80 mm, and the perpendicular distance between inner and outer wheels is 50 mm, then the maximum clearance would be 0.31 mm. In many applications this would be too much. These clearances become even larger if the radius of the curved sections is smaller, and if any of the dimensions of the trapezium formed by the centres of the bearing wheels increase. In practice, the need to limit the clearances has the effect of limiting the track shapes which can be made, and also minimising the separation of the bearing wheels with a consequent limitation of the moment load capacity of the carriages.

A second type of carriage (FIG. 3) has two pairs of bearing wheels, each mounted on a sub-plate which is then connected by a pivot to the main carriage plate. These sub-plate assemblies move to allow the carriage to travel around tracks with left handed and right handed curves, and curves of differing radii, with very little clearance between bearing wheels and the track. The additional parts and complexity of the sub-plates and swivel bearings makes these carriages more expensive than the first type, and they are not suited to traversing track systems with very tight bend radii. The sub-plates and bearings may also result in increased friction between the bearing wheels and the track.

NL 1 001 452-C discloses a track and carriage system for reading barcodes. The carriages have a single bearing wheel on one side of the track and a pair of bearing wheels on an opposite side of the track. Although the draughtsman appears to recognise that changes in track geometry might be desirable, the profile of the sides exhibit sharp changes in radius which would be undesirable, and there is no further reference to the shape, which is not a key feature of the patent specification.

Tracks and carriages are also used in overhead rail systems where the track forms a rail which varies in a vertical plane, and the wheels run along the upper and lower surfaces of the rail. In such systems the weight of the carriage and any load which it carries always act in a downward direction helping to maintain contact with the rail.

Japanese Utility Model No. 5-54601 discloses an overhead rail system in which the carriage has bearing wheels which run along the upper surface of the rail and a single guide wheel which contacts a lower surface of the rail. At curved sections the upper surface of the rail is cut away so that the rail becomes thinner, but this would not allow close contact to be simultaneously maintained with the upper and lower surfaces of the rail, particularly if the upper surface lies on the outer radius of a curve (FIG. 2).

GB 2 261 863-A discloses a conveyor system having powered trolleys mounted on an overhead rail of varying thickness. In this proposal a single drive wheel operates against an upper surface of the rail and a pair of spaced bucking rollers are provided with pressure means (i.e. spring loaded) to ensure adherence of the drive wheel with the rail. A major disadvantage of such an arrangement is that the spring loading increases friction between the carriage and the rail. The document states: "Thanks to the particular form of the rail the trolleys need pressure springs with limited travel and hence reduced dimensions, their extension being included between the compression position on the sections 21 and the compression position on the sections 20. In addition, between said two positions it is not necessary that the spring have approximately constant thrust but instead said thrust is advantageously variable to fall to the minimum on the horizontal sections, thus reducing the rolling friction." Thus, notwithstanding the variable geometry of the rail, variable spring loading is essential to maintain low friction.

A similar suspended rail and carriage arrangement is disclosed in JP 3 070 670-A, in which the carriage again has a single drive wheel on an upper surface of the rail and a pair of spring loaded wheels which maintain contact with a lower surface of the rail. In curved parts of the rail at ascending and descending sections the radius of curvature of the lower surface is changed by a predetermined amount relative to the radius required for a uniform thickness. This is well-documented form of geometry which, for certain applications and particular combinations of carriage and track size could be a reasonable approximation, but in the absence of spring loading, the clearance between the wheels and the track would be relatively high.

The present invention seeks to provide a new and inventive form of track system in which the carriages can have a large transverse moment load capacity and relatively free movement with a minimum number of components, and which provides considerably greater flexibility in the layout of the tracks.

SUMMARY OF THE INVENTION

The present invention arises from a new perception that if a carriage is provided with three bearing wheels mounted in fixed positions, one engaging one side of the track and two engaging the other, the profile of the track can be configured in such a way that a very small clearance can be achieved throughout a much broader range of shapes than has hitherto been possible. Such track profiles may, for example, encompass extremely complex shapes which comprise inside and outside curves and radii of curvature varying from substantially straight sections to very tight curves.

The precise tolerances achievable with known tracks and carriages will depend upon the geometry of the system. With the majority of fixed four-wheel track systems which are currently produced the typical lift-off (clearance) is no better than 0.1 to 0.5 mm. This figure can be improved by reducing the separation of the wheels or increasing the minimum track radius, but for track systems which do not incorporate curved sections of large radius or closely spaced bearings the calculated lift-off using the method described in relation to FIG. 14 is considerably greater than 0.075 mm. In contrast, comparable track systems in accordance with the present invention are generally capable of achieving tolerances of less than 0.05 mm.

It has been found that by using three bearing wheels with fixed geometry it is possible to design track layouts which maintain low friction and have an extremely close tolerance compared with existing four-wheel carriages. With such an arrangement it is possible to have wider carriages and tighter curves. This can improve the moment load capacity of the carriages and allows track systems to be produced which occupy less space.

Although in an endless track system the single bearing may be on the inside or outside of the track, the geometry of the track will normally be better if the single bearing is on the inside.

A three-bearing carriage generally has a lower load capacity than an equivalent four-bearing carriage, and the position of the peak load carrying capacity is offset from the geometrical centre of the carriage. However, these drawbacks may be compensated if the single bearing has a larger load capacity (i.e. is of greater diameter) than the two bearing wheels on the opposite side.

In track systems in accordance with the invention the track may be manufactured from a single piece without joints. For additional strength the track may also be integrally formed with a base plate.

This can eliminate any problems associated with assembly and setting, and possible movement of the joints in use. The combined track and integral base plate may also be used as a structural element within a machine. In large track systems it may be necessary to manufacture the track in sections, but the individual sections may be of variable curvature resulting in a reduced number of joints. There may be at least one section which includes two or more of a straight portion, an outside curved portion, and an inside curved portion.

A useful embodiment of the track system comprises mutually spaced inner and outer sections and a rack, and each carriage carries a pinion which is mounted between the inner and outer sections in continuous driving engagement with the rack.

In many embodiments the track will be located between the bearing wheels so that the carriage bearing wheels engage on the outside of the track profile. However, in a further useful embodiment of the design the track is in the form of a profiled channel with internal shape features which engage and locate on corresponding features on the bearing wheels. A key benefit of this design is that, for a given size of carriage, the loading points on track and wheels are much more widely separated and thus the transverse moment load capacities are much greater than with the more conventional designs where the carriage bearing wheels engage on the outside of the track profile.

BRIEF DESCRIPTION OF THE DRAWINGS

The following description and the accompanying drawings referred to therein are included by way of non-limiting example in order to illustrate how the invention may be put into practice. In the drawings:

FIG. 4 is a general view of a track system in accordance with the invention;

FIG. 5 is a plan view of the track shown in FIG. 4;

FIG. 6 is a sectional view of the track shown in FIGS. 4 and 5;

DETAILED DESCRIPTION OF THE DRAWINGS

Figure 1:
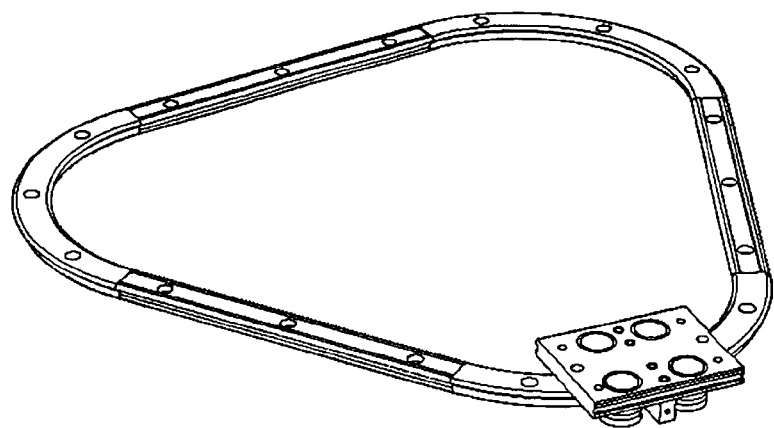
FIGS. 1 to 3 show three prior art track systems.

FIG. 1 is a general view of a track system which is representative of the prior art. This version uses a carriage with four bearing wheels located at fixed positions on a carriage, and this runs around a closed track which is substantially triangular in shape.

Figure 2:
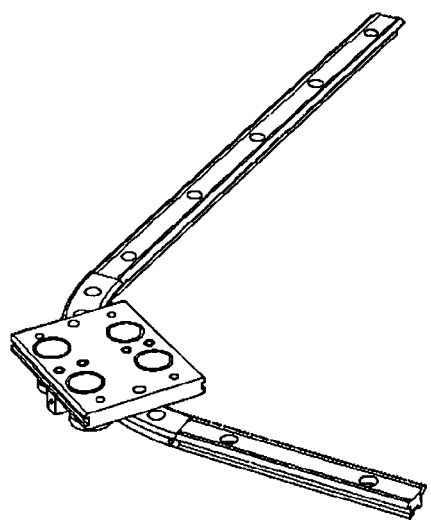

FIG. 2 is a general view of a track system which is representative of the prior art. This version uses a carriage with four bearing wheels located at fixed positions on a carriage, and this runs along an open track which is substantially L-shaped.

Figure 3:
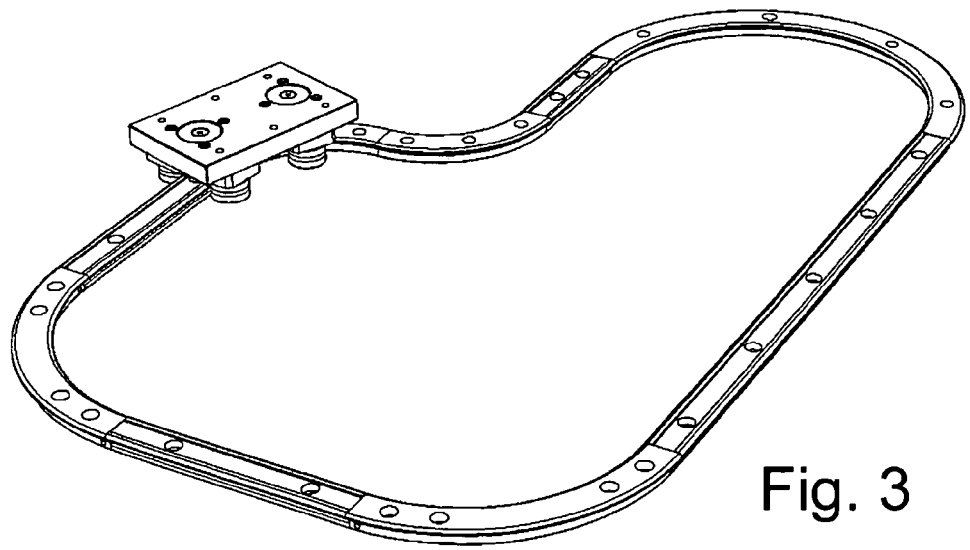

FIG. 3 is a general view of a track system which is representative of the prior art. This version uses a carriage with two pairs of bearing wheels each located on sub-plates which are connected by pivots to a carriage plate. This runs around a closed track which has curved portions of differing radii and direction.

Figure 14:
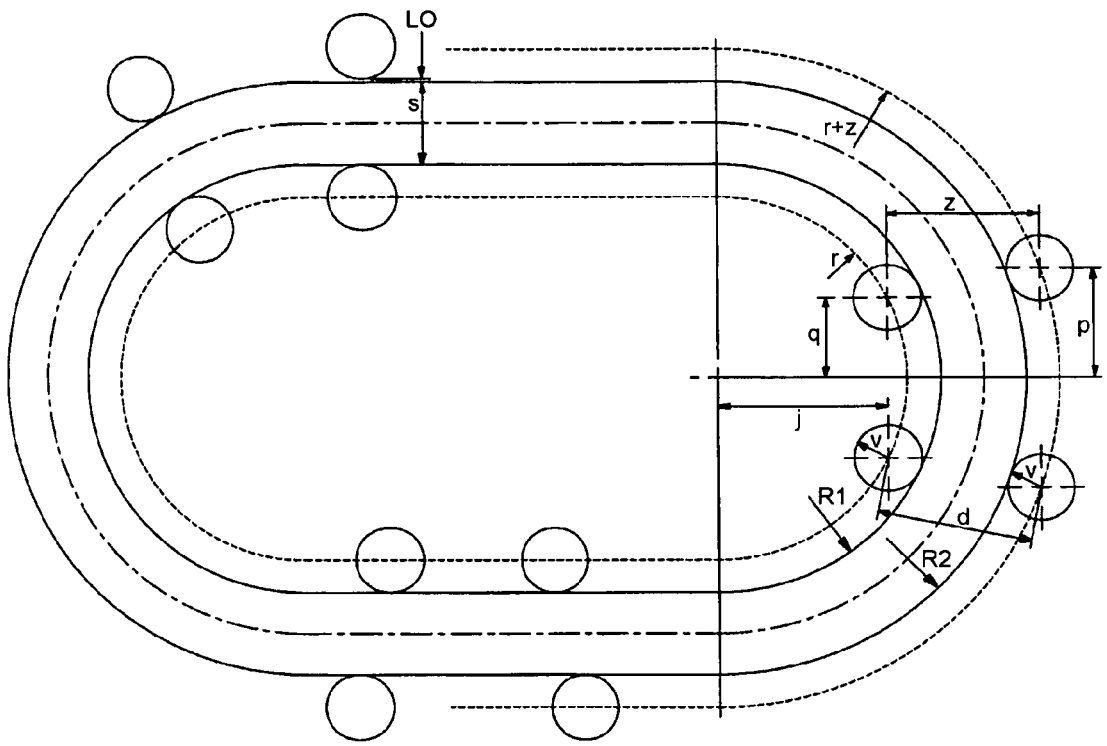
FIG. 14 shows the method used to calculate the minimum tolerance of the prior art track systems of FIGS. 1 to 3.

The formulae given in FIG. 14 apply to prior art track systems such as those of FIGS. 1 and 2 in which the carriages have four fixed wheels. The formulae allow the optimum positions of the wheels to be determined in a situation where there is zero clearance when all four wheels are either entirely on the straight or entirely on the curve, and also provide a means of calculating the maximum clearance at the transition with any values for the characteristic dimensions r, p & z. For a typical system in which the centres of the inner wheels are 40 mm apart and the track radius is 80 mm, and the perpendicular distance between inner and outer wheels is 50 mm, the maximum clearance is calculated to be 0.31 mm. As has already been noted, in practice, the vast majority of useful track systems would have a calculated lift-off within the range 0.1 to 0.5 mm, and it would be difficult to find a known track system with a clearance better than 0.075 mm.

FIG. 4 is a general view of a track system in accordance with the present invention. This includes straight sections 20, curves of differing radii 21, 22 and both inside and outside curves 23. A carriage 10 with three bearing wheels 12, 13 and 14 is mounted on the track.

FIG. 5 is a plan view of the track shown in FIG. 4. This shows that the sectional width of the track varies around the circuit.

FIG. 6 is a sectional view of the track shown in FIGS. 4 and 5. This shows the profiles of the bearing wheels 12, 13 and 14 engaged on the corresponding features of the track.

Referring firstly to FIGS. 4 to 6, the track system includes an endless track 1 having an inside edge 4 and an outside edge 5 each provided with a respective rail 6, 7. The track 1 is machined without joints from a single piece of material.

The track is used with a set of carriages 10, one of which is shown. As known in the art, the carriages may be interlinked and driven by a suitable drive mechanism (not shown) so that they all travel continuously around the track. Each carriage has a carriage plate 11 of any suitable shape, beneath which are mounted suitable bearing wheels 12, 13 and 14. On one side of the track, i.e. the inside edge 4, the carriage has a single bearing 12 to engage the inside rail 6. On the opposite outside edge 5 the carriage has a pair of spaced bearing wheels 13 and 14 to engage the outside rail 7, one of which is arranged to lead the single bearing 12 and the other arranged to follow. The dimensions of the track 1 are accurately calculated such that the width of the track between the side edges 4 and 5 varies in such a way that the curvature of both sides changes smoothly without abrupt changes in radius. As the carriage moves around the track, a close tolerance is maintained between the bearing wheels and the sides of the track, eliminating any lateral play.

Figure 7:
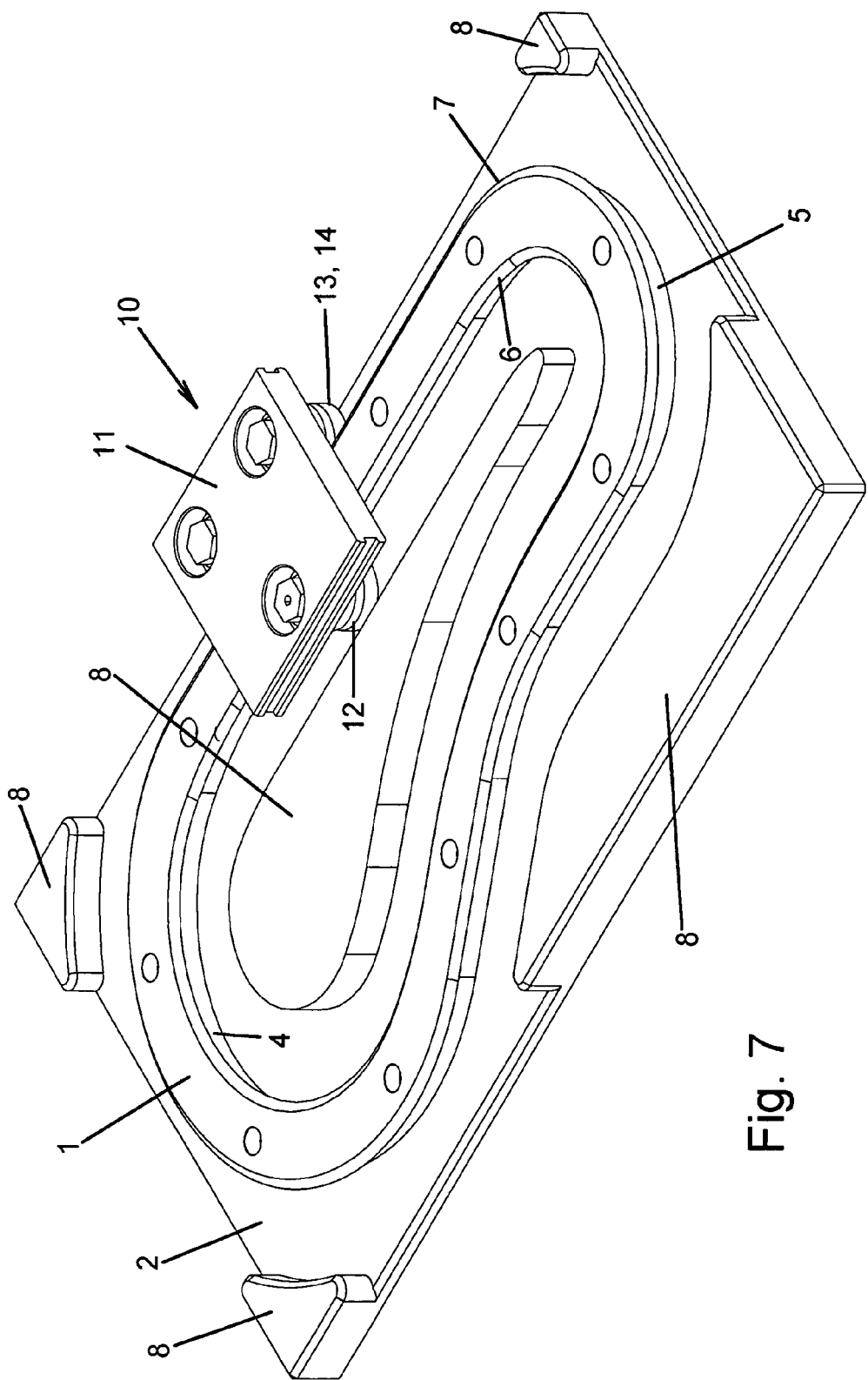
FIG. 7 is a general view of another variant of the track system.

FIG. 7 is a general view of a track system in accordance with the design. This is similar to the track shown in FIGS. 4 to 6, but includes a base plate 2 integral with the track 1. This may obviate the need for a separate mounting plate, and can also form a strong, structural element of a machine incorporating the track. The track 1 is supported by the base plate 2 but is otherwise similar the track previously described. The track 1 and base plate 2 are both machined without joints from a single piece of material.

In this example the base plate has integral raised areas 8, which are coplanar with the upper surface of the track 1 and spaced from its inside edge 4, but depending on the application the base plate 2 may also be flat.

The track is used with a set of carriages 10, one of which is shown. The carriages may be interlinked and driven by a suitable drive mechanism (not shown) so that they all travel continuously around the track. Each carriage has a carriage plate 11 of any suitable shape, beneath which are mounted suitable bearing wheels 12, 13 and 14. On one side of the track, i.e. the inside edge 4, the carriage has a single bearing 12 to engage the inside rail 6. On the opposite outside edge 5 the carriage has a pair of spaced bearing wheels 13 and 14 to engage the outside rail 7, one of which is arranged to lead the single bearing 12 and the other arranged to follow. The dimensions of the track 1 are accurately calculated such that the width of the track between the side edges 4 and 5 varies in such a way that, as the carriage moves around the track, a close tolerance is maintained between the bearing wheels and the sides of the track.

In large layouts it might still be necessary to manufacture the track in sections and fix them to a baseplate, but the total number of joints can still be reduced relative to a conventional track system.

Figure 8:
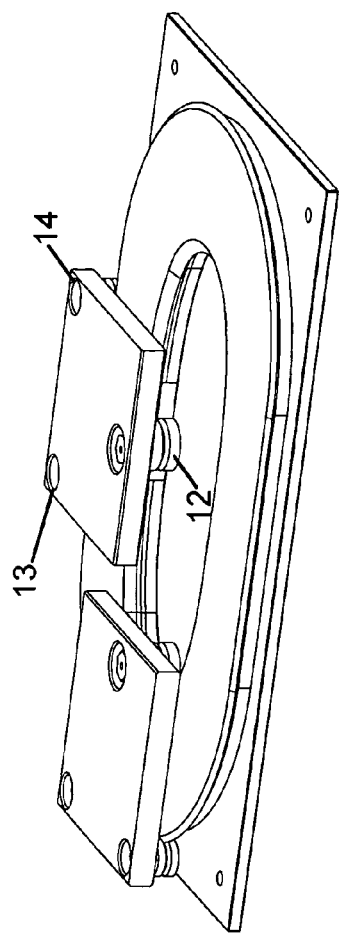
FIG. 8 is a general view of another track system in accordance with the invention.

FIG. 8 is a general view of another track system in accordance with the invention. An inherent disadvantage of a three-bearing carriage is that it has a lower load capacity compared with a four-bearing carriage, and the position of the load carrying capacity does not lie at the geometrical centre of the carriage. In this embodiment the single bearing 12 is increased in diameter by an appropriate amount relative to the other two bearing wheels 13 and 14, so that it is possible to centre the load capacity and increase it to that of an equivalent four-bearing carriage.

This track includes a number features which take advantage of beneficial characteristics of the design:

- The sectional width of the carriage is large compared to the bend radius, giving a high transverse moment load capacity for the carriage.
- The central bearing is larger and stronger than the two on the outside, thus compensating for the asymmetric position of the centroid of the load capacity in a three bearing carriage using three similar wheels.
- The track profile is asymmetric to match the bearings used.
- The track 1 is made integral with a base plate 2. This may obviate the need for a separate mounting plate, and can also form a strong, structural element of a machine incorporating the track.

Figure 9:
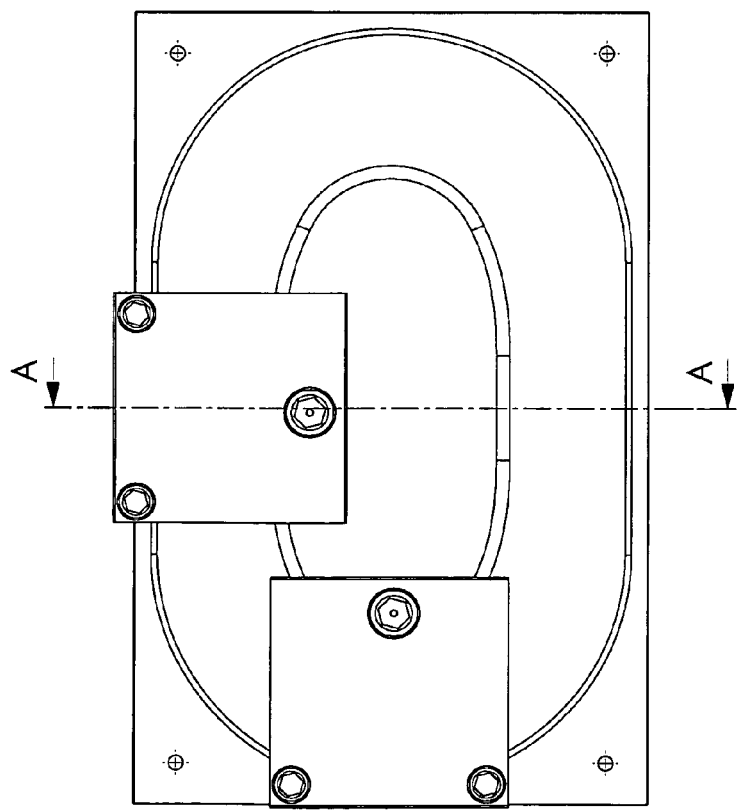
FIG. 9 is a plan view of the track shown in FIG. 8.

FIG. 9 is a plan view of the track shown in FIG. 8. This shows that the sectional width of the track 1 varies around the circuit.

Figure 10:
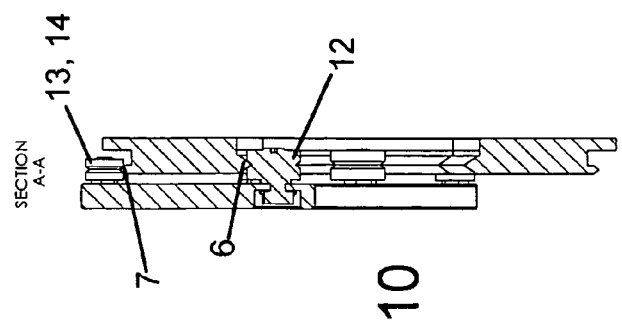
FIG. 10 is a sectional view of the track shown in FIGS. 8 and 9.

FIG. 10 is a sectional view of the track shown in FIGS. 8 and 9.

This shows the asymmetry of the bearing wheels 12, 13 and 14 and track edge profiles 6 and 7.

Figure 11:
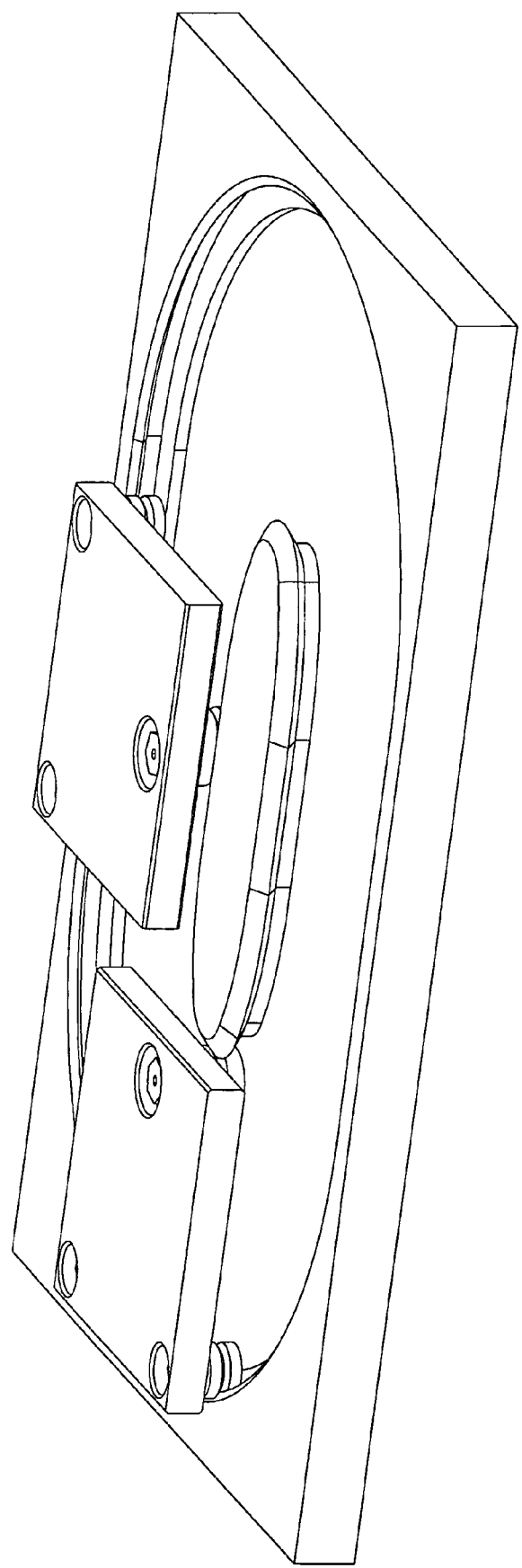
FIG. 11 is a general view of a further embodiment of the track system.

FIG. 11 is a general view of a further track system in accordance with the invention. The carriage design and path is similar to the track shown in FIGS. 8-10 but the track is configured as a channel such that the bearing wheels engage on the inside of the channel. This has advantages, particularly offering a much higher transverse moment load capacity than the alternative configuration.

Figure 12:
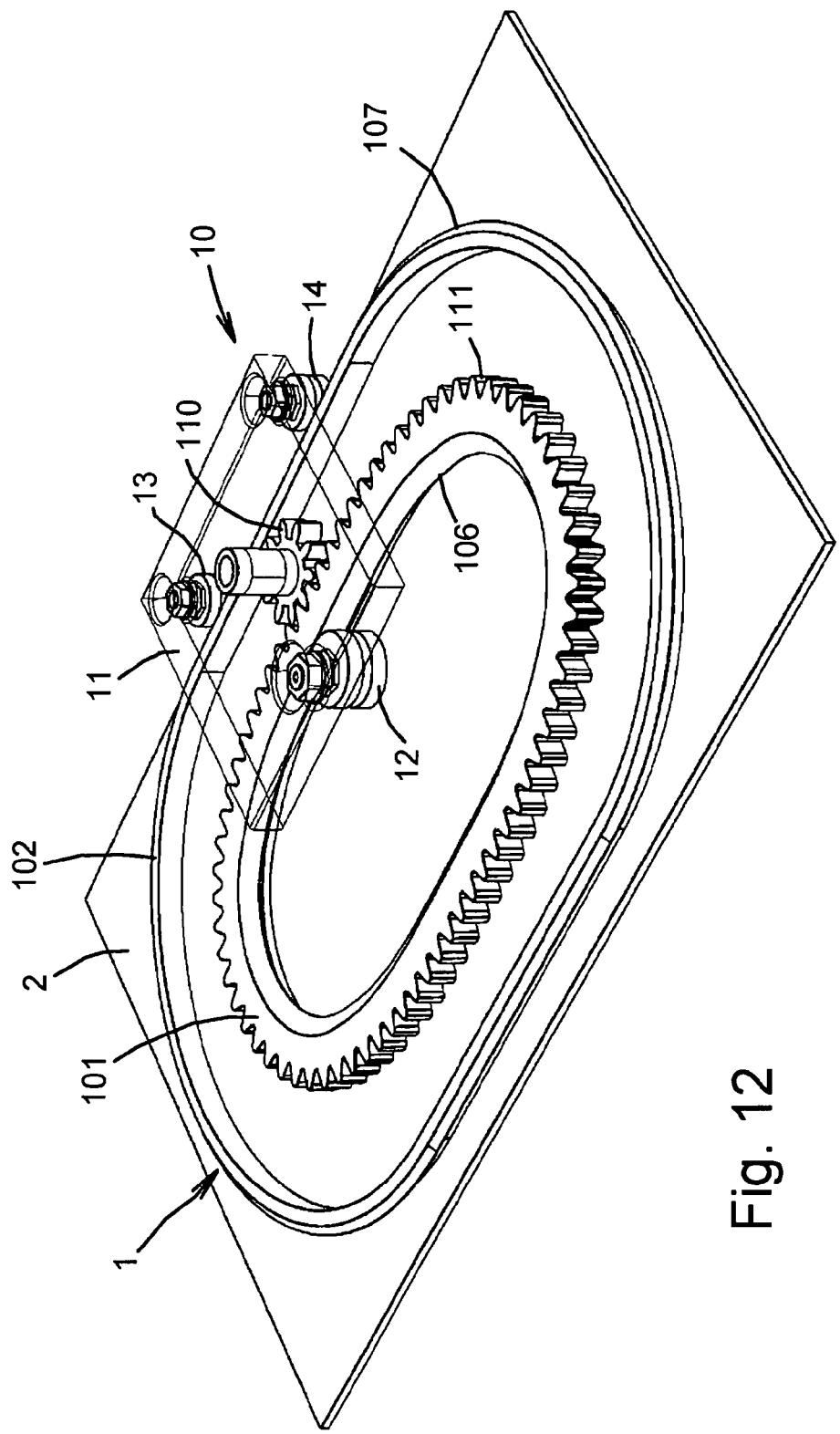
FIG. 12 is a general view of another useful embodiment of the track system incorporating a rack and pinion.

A further embodiment of the track system of the invention is shown in FIG. 12. This track system includes an endless track 1 which comprises inner and outer sections 101 and 102 supported by a base plate 2. The inside edge of the inner section 101 is provided with an inner rail 106, and the outside edge of the outer section 102 is similarly provided with an outer rail 107, both spaced above the base plate 2. Each carriage 10 has a carriage plate 11, beneath which are mounted suitable bearing wheels 12, 13 and 14. The single bearing 12 is larger than the other two bearing wheels 13 and 14 and is arranged to engage the rail 106 on the inside of the track. Bearing wheels 13 and 14 engage the outside rail 107, one being arranged to lead the single bearing 12 and the other arranged to follow. Between the three bearing wheels the carriage plate 11 carries a rotatable pinion 110 which is located in the space between the inner and outer track sections 101 and 102. The pinion is engaged with a rack 111, which in this example is formed on the outside edge of the inner section 101. As in the previous examples, the dimensions of the track sections 101 and 102 are accurately calculated such that the width of the track between the rails 106 and 107 varies in such a way that, as the carriage moves around the track, a close tolerance is maintained between the bearing wheels and the sides of the track. In addition, the pitch line of the rack and gear follows the curve of the track in such a way that there is a uniform small clearance between the pinion 110 and the rack 111. This is a considerable advantage over the prior art in which the pinion usually has to be mounted on a spring-loaded arm to maintain correct engagement with the rack. The present arrangement therefore has fewer parts, provides a smoother action, and is less subject to wear. If the carriages are linked together and driven round the track the pinion can be used to provide rotary drive take-off to the carriages.

Alternatively, the carriages could be provided with a motor to drive the pinion and thereby move the carriages around the track.

Figure 13:
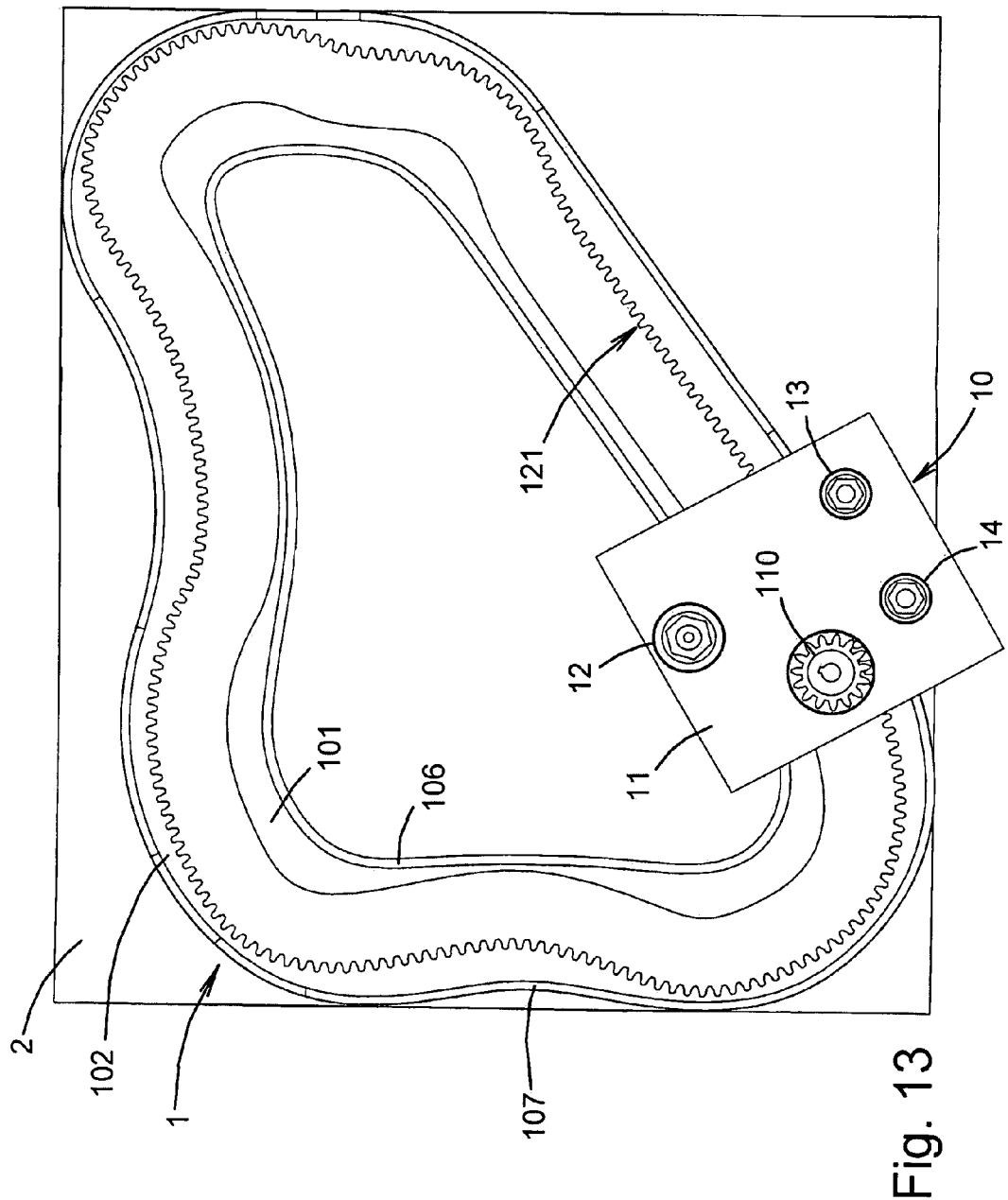
FIG. 13 is a general view of another rack and pinion track system in accordance with the invention.

Another embodiment of a rack and pinion track system of the invention, showing a more complex track shape comprised of inside and outside curves of continuously changing radius, is shown in FIG. 13. This track system includes an endless track 1 which comprises inner and outer sections 101 and 102 supported by a base plate 2. The inside edge of the inner section 101 is provided with an inner rail 106, and the outside edge of the outer section 102 is similarly provided with an outer rail 107, both spaced above the base plate 2. Each carriage 10 has a carriage plate 11, beneath which are mounted suitable bearing wheels 12, 13 and 14. The single bearing 12 is larger than the other two bearing wheels 13 and 14 and is arranged to engage the rail 106 on the inside of the track. Bearing wheels 13 and 14 engage the outside rail 107, one being arranged to lead the single bearing 12 and the other arranged to follow. Between the three bearing wheels the carriage plate 11 carries a rotatable pinion 110 which is located in the space between the inner and outer track sections 101 and 102. The pinion is engaged with a rack 121, which in this example is formed on the inside edge of the outer section 102. As in the previous examples, the dimensions of the track sections 101 and 102 are accurately calculated such that the width of the track between the rails 106 and 107 varies in such a way that, as the carriage moves around the track, a close tolerance is maintained between the bearing wheels and the sides of the track. In addition, the pitch line of the rack 121 and pinion 110 follows the curve of the track in such a way that there is a uniform small clearance between the pinion and the rack. If the carriages are linked together and driven round the track the pinion can be used to provide rotary drive take-off to the carriages. Alternatively, the carriages could be provided with a motor to drive the pinion and thereby move the carriages around the track.

In each embodiment of the invention as exemplified by FIGS. 4 to 13 it is possible using known engineering methods to design the dimensions of the track in such a way that a maximum clearance of less than 0.05 mm can be maintained between the carriage bearing wheels and the sides of the track. This is a significantly better tolerance than has generally been achieved using four fixed wheels. Furthermore, fixed three-wheel geometry allows complex shapes and tight curves to be achieved with a good transverse moment load capacity and without the disadvantages of spring loading and variable wheel geometry.

It should be noted that although the positions of the bearing wheels are fixed in use this does not preclude one or more of the bearing wheels being adjustable to set the minimum clearance prior to use.

The invention claimed is:

1. A track system of the kind which includes a track having a combination of straight and curved portions or curved portions with different radii of curvature and one or more carriages having bearing wheels engaged with the track such that the carriages can travel along the track, in which the carriages have a single bearing wheel engaged with one side of the track and a pair of bearing wheels engaged with an opposite side of the track, in which, all of the bearing wheels are mounted in fixed positions against movement relative to the carriage, including against movement toward and away from the opposite sides of the track, and in which the width of the track between the said opposite sides varies such that the curvature of both sides changes smoothly without abrupt changes in radius such as to maintain a close tolerance between the bearing wheels and the respective sides of the track.

2. A track system according to claim 1 in which the single bearing is on the inside of an endless track.

3. A track system according to claim 1 in which the single bearing is of greater diameter than the pair of bearing wheels on the opposite side.

4. A track system according to claim 1 in which the track is manufactured from a single piece of metal without joints.

5. A track system according to claim 1 in which the track is integrally formed with a base plate.

6. A track system according to claim 1 in which the track is formed of separate sections.

7. A track system according to claim 6 in which there is at least one section which includes two or more of a straight portion, an outside curved portion, and an inside curved portion.

8. A track system of the kind which includes a track having a combination of straight and curved portions or curved portions with different radii of curvature and one or more carriages having bearing wheels engaged with the track such that the carriages can travel along the track, in which the carriages have a single bearing wheel engaged with one side of the track and a pair of bearing wheels engaged with an opposite side of the track, in which all of the bearing wheels are mounted in fixed positions against movement relative to the carriage, including against movement toward and away from the opposite sides of the track, in which the width of the track between the said opposite sides varies such that the curvature of both sides changes smoothly without abrupt changes in radius such as to maintain a close tolerance between the bearing wheels and the respective sides of the track, and in which the maximum clearance between the bearing wheels and the respective sides of the track is less than 0.075 mm.

9. A track system of the kind which includes a track having a combination of straight and curved portions or curved portions with different radii of curvature and one or more carriages having bearing wheels engaged with the track such that the carriages can travel along the track, in which the carriages have a single bearing wheel engaged with one side of the track and a pair of bearing wheels engaged with an opposite side of the track, in which all of the bearing wheels are mounted in fixed positions, against movement relative to the carriage, including against movement toward and away from the opposite sides of the track, in which the width of the track between the said opposite sides varies such that the curvature of both sides changes smoothly without abrupt changes in radius such as to maintain a close tolerance between the bearing wheels and the respective sides of the track, and in which the maximum clearance between the bearing wheels and the respective sides of the track is less than 0.05 mm.

10. A track system of the kind which includes a track having a combination of straight and curved portions or curved portions with different radii of curvature and one or more carriages having bearing wheels engaged with the track such that the carriages can travel along the track, in which the carriages have a single bearing wheel engaged with one side of the track and a pair of bearing wheels engaged with an opposite side of the track, in which all of the bearing wheels are mounted in fixed positions against movement relative to the carriage, including against movement toward and away from the opposite sides of the track, in which the width of the track between the said opposite sides varies such that the curvature of both sides changes smoothly without abrupt changes in radius such as to maintain a close tolerance between the bearing wheels and the respective sides of the track, and in which the track comprises mutually spaced inner and outer sections and a rack, and each carriage carries a pinion which is mounted between the inner and outer sections in continuous driving engagement with the rack.

11. A track system of the kind which includes a track having a combination of straight and curved portions or curved portions with different radii of curvature and one or more carriages having bearing wheels engaged with the track such that the carriages can travel along the track, in which the carriages have a single bearing wheel engaged with one side of the track and a pair of bearing wheels engaged with an opposite side of the track, in which all of the bearing wheels are mounted in fixed positions, against movement relative to the carriage, including against movement toward and away from the opposite sides of the track, and the width of the track between the said opposite sides varies such that the curvature of both sides changes smoothly without abrupt changes in radius such as to maintain a close tolerance between the bearing wheels and the respective sides of the track, and in which the track is in the form of a profiled channel with internal shape features which engage and locate on corresponding features on the bearing wheels.

* * * * *